US008676253B2

(12) United States Patent
Li

(10) Patent No.: US 8,676,253 B2
(45) Date of Patent: Mar. 18, 2014

(54) METHOD AND DEVICE FOR RANKING FREQUENCIES

(75) Inventor: Wenjie Li, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/574,563

(22) PCT Filed: May 24, 2011

(86) PCT No.: PCT/CN2011/074548
§ 371 (c)(1),
(2), (4) Date: Jul. 20, 2012

(87) PCT Pub. No.: WO2012/100474
PCT Pub. Date: Aug. 2, 2012

(65) Prior Publication Data
US 2013/0203461 A1    Aug. 8, 2013

(51) Int. Cl.
*H04W 88/02* (2009.01)
(52) U.S. Cl.
USPC .................................................... 455/552.1
(58) Field of Classification Search
USPC .................................................... 455/552.1
See application file for complete search history.

(56) References Cited

U.S. PATENT DOCUMENTS

| | | | |
|---|---|---|---|
| 8,018,865 B2* | 9/2011 | Fan et al. | 370/252 |
| 8,244,301 B2* | 8/2012 | Shi | 455/558 |
| 8,274,938 B2* | 9/2012 | Chang et al. | 370/329 |
| 2003/0125073 A1* | 7/2003 | Tsai et al. | 455/552 |
| 2009/0149220 A1* | 6/2009 | Camilleri et al. | 455/558 |
| 2010/0248782 A1* | 9/2010 | Cheon | 455/558 |
| 2011/0012987 A1* | 1/2011 | Yoon | 348/14.02 |
| 2012/0269173 A1* | 10/2012 | Chin et al. | 370/332 |

FOREIGN PATENT DOCUMENTS

| | | |
|---|---|---|
| CN | 101203005 A | 6/2008 |
| CN | 101951287 A | 1/2011 |
| JP | 2007-81501 A | 3/2007 |

* cited by examiner

*Primary Examiner* — Diane Mizrahi
(74) *Attorney, Agent, or Firm* — Kilpatrick Townsend & Stockton LLP

(57) ABSTRACT

An arbitration method and device for arbitrating receiving conflict in a multi-mode multi-SIM multi-standby communication terminal is provided. The method includes: determining if there are at least two cards to receive messages in a time cycle while all of the cards are in standby states, the time cycle being a radio frame of one card; identifying types of messages to be received by the at least two cards after determining there are at least two cards to receive messages in the time cycle, and the types of messages comprising paging message and broadcast message; determining if a receiving conflict occurs; and arbitrating based on the types of receiving conflicts and obtaining arbitration results after determining there is a receiving conflict. The arbitration results include: receiving a paging message preferentially; receiving the paging message with the longest paging period; and receiving the broadcast message with the highest priority.

12 Claims, 4 Drawing Sheets

METHOD AND DEVICE FOR RANKING FREQUENCIES

FIELD OF THE DISCLOSURE

The present disclosure generally relates to communication device and method, and more particularly, to a multi-mode multi-SIM multi-standby communication terminal, and an arbitration method and an arbitration device for arbitrating receiving conflict thereof.

CROSS REFERENCE TO RELATED APPLICATIONS

This application is a Section 371 National Stage Application of International Application No. PCT/CN2011/074548, filed on May 24, 2011, the entire contents of which are incorporated herein by reference in their entirety.

BACKGROUND OF THE DISCLOSURE

With rapid development of the communication technology, information exchange among people appears more and more frequently. A single mobile phone may not meet the needs of people, especially those engaged in marketing or management, who may have to carry two or more mobile phones to meet the communication requirements, which brings inconvenience. Nowadays, multi-SIM multi-standby communication devices are emerging, which makes a user only need to carry one communication device with more than one Subscriber Identity Module (SIM) card or more than one Universal Subscriber Identity Module (USIM) card. It is far more convenient than the conventional way to carry several mobile phones.

Based on the Second Generation (2G) wireless network technology, Globe System of Mobile Communication (GSM) is one of the most widely used mobile communication systems. In general, if a subscriber wants to use multiple phone numbers in a single device in GSM system, the following solutions may be employed.

Firstly a multi-SIM single-standby communication device may be used. In this communication device, there is more than one SIM card simultaneously, however, only one SIM card can be used (be set in a standby state) at the same time, and switching among the multiple SIM cards is executed by hardware circuits, which is generally selected when the device is powered on. Due to the effect of a protocol stack, the switching among the multiple SIM cards can not be executed dynamically when the communication device is in operation. For this matter, the mobile phone system needs to be rebooted (mainly reboot protocol stack or upper-layer software) to switch among the multiple SIM cards.

Secondly, a multi-SIM multi-standby communication device may be used to overcome the disadvantages in the multi-SIM single-standby communication device, which multiple SIM cards can be standby simultaneously just like carrying multiple mobile phones, thereby improving practical application greatly.

An early multi-SIM multi-standby communication device actually possesses multiple sets of systems, generally two, each of which has a radio frequency (RF) transceiver module, a base band processing module, and a protocol stack respectively. The communication device having multiple systems can realize multiple SIM cards respectively in standby or communicating state, which is also referred to as a multi-SIM multi-standby multi-communicating communication device. However, this kind of communication device, with multiple systems utilized, suffers additional cost and power consumption, and a short standby time, which causes inconvenience for the users.

Later multi-SIM multi-standby mobile phone is a kind of multi-SIM multi-standby single-communicating communication device, which uses only one set of communication module, including such as a RF transceiver module and a base band processing module, compared with the early multiple systems. Because the upper protocol stacks needs to cooperate, the protocol stacks which operate independently in the early multi-SIM multi-standby multi-communicating communication device needs a close integration. Although the practical operation becomes more complicated, the multi-SIM multi-standby function may be achieved. Generally, multiple cards may be set in standby states simultaneously by receiving paging messages and broadcast messages in turn under the control of the protocol stacks. In the multi-SIM multi-standby single-communicating communication device, while one SIM card is conducting a voice business, the other SIM cards are unable to receive paging message and broadcast message and to transmit communication signaling.

Nowadays, with development of the Third Generation (3G) mobile communication technology, 3G service based on such as Time Division-Synchronous Code Division Multiple Access (TD-SCDMA), or Wideband Code Division Multiple Access (WCDMA) is popularized throughout the country, and more and more people start to use 3G mobile phones. However, the number of users using 2G mobile phones is still in the majority. Accordingly, during the transitional period from 2G to 3G, it appears quite convenient for one mobile phone to support both the 2G and 3G standby modes.

Regardless of 2G; 3G, or the Long Term Evolution (LTE) of 3G system, there is a radio interface according to the communication protocol, such as a Uu interface for a 3G system, when a mobile phone communicates with a base station. All physical channels take three-layer structure with respect to timeslots, radio frames and system frame numbering. As for a GSM system, one frame includes 8 time slots (TS), 26 or 51 frames are multiplexed to constitute one multiframe, multiple multiframes constitute one superframe, and multiple superframes constitute one hyperframe. As for a TD-SCDMA system, one sub-frame length is 5 ms, which includes 7 normal time slots and 3 special time slots. Two sub-frames constitute a radio frame. As for a WCDMA system, a radio frame with a duration of 10 ms for a dedicated physical control channel or a dedicated physical data channel has 5 sub-frames. Each sub-frame includes 3 time slots, so each radio frame includes 15 time slots. However, for a Primary Common Control Physical Channel (P-CCPCH), it is a radio frame with a duration of 10 ms which includes 15 time slots rather than any sub-frame. Therefore, the radio frame of both TD-SCDMA and WCDMA has the same length of 10 ms. As for the Long Term Evolution (LIE) of a 3G system, the radio frame has two kinds of structure. For Frequency Division Duplex (FDD) LTE, one radio frame with a duration of 10 ms is divided into 10 sub-frames, and each sub-frame includes 2 time slots. For Time Division Duplex (TD) LIE, one radio frame with a duration of 10 ms is divided into two half-frames. Each half-frame includes 5 sub-frames, and each sub-frame includes 2 time slots.

Nowadays, a communication terminal (e.g. a mobile phone) having multiple communication modes is commonly operated with a multi-SIM multi-standby multi-communicating system to achieve the multi-SIM multi-standby function, that is, multiple sets of communication modules, each of which includes an RF transceiver module, a base band processing module, and a protocol stack, are used, and each set of communication module is employed to achieve the standby or communication function for one communication mode. As shown in FIG. 1, a dual-mode dual-SIM dual-standby communication terminal is taken as an example. FIG. 1 is a schematic structural diagram of a dual-mode dual-SIM dual-standby communication terminal according to the prior art. The dual-mode dual-SIM dual-standby communication terminal employs two RF transceiver modules which are operated independently, one is the TD-SCDMA RF transceiver module 101a for the TD-SCDMA mode, and the other is the GSM RF transceiver module 101b for the GSM mode. As for base band, there are two types of structures based on the design of different manufacturers. In the first type, two base band processing modules operate independently. As shown in FIG. 1, the base band processing module 102 includes a TD-SCDMA base band processing module 102a and a GSM base band processing module 102b which respectively process signals transmitted/received through TD-SCDMA RF transceiver module 101a and GSM RF transceiver module 101b. Besides, the TD-SCDMA base band processing module 102a may interact with the GSM base band processing module 102b. In the second type, only one base band processing module is provided. In the TD-SCDMA mode, a Universal Subscriber Identity Module (USIM) card 103a may achieve the standby or communication function through the TD-SCDMA base band processing module 102a and the TD-SCDMA RF transceiver module 101a. In the GSM mode, a SIM card 103b may achieve the standby or communication function through the GSM base band processing module 102b and the GSM RE transceiver module 101b. FIG. 1 is a schematic structural diagram of a dual-mode dual-SIM dual-standby communication terminal operable in TD-SCDMA/GSM modes. In fact, a SIM card is applicable in the TD-SCDMA mode, and a USIM card is also applicable in the GSM mode. In addition, the structure of a dual-mode dual-SIM dual-standby communication terminal operable in WCDMA/GSM is similar to that in TD-SCDMA/GSM, except that TD-SCDMA modules need be replaced with WCDMA modules.

As mentioned above, this kind of mobile phone, with multiple systems utilized, suffers an additional cost and power consumption, a short standby time, and an increased size, which causes inconvenience. Despite this, as for the RF transceiver module, there exists co-channel interference. For example, while GSM operates at 1900 MHz and TD-SCDMA operates at 2 GHz, the problem of co-channel interference arises between the RF transceiver modules due to the very close operating frequencies, which may seriously influence the transmission/reception performance. A single RF transceiver module may be used to solve the problem of co-channel interference, but a new problem of receiving conflict is introduced. For example, in a dual-SIM dual-standby mobile phone, one card needs to receive paging message or broadcast message when another card is receiving paging message or broadcast message. However, because there is only one RF transceiver module and the two SIM cards can not receive messages simultaneously, the problem of receiving conflict arises. Therefore, it is desirable to solve the problem of receiving conflict for the multi-mode multi SIM multi-standby mobile phone in the standby state.

Related information may refer to Chinese patent application No. 201010278680.5 which discloses a solution to receiving conflict for a multi-SIM multi-standby communication terminal. However, the disclosure is only applicable to a single-mode situation, in which the receiving conflict is caused by the signal asynchronism of base station, but is not applicable to a multi-mode situation.

BRIEF SUMMARY OF THE DISCLOSURE

The problem to be solved in the present disclosure is that the multi-mode multi-SIM multi-standby communication terminal with multiple RF modules utilized suffers an additional cost and power consumption, a short standby time, and serious co-channel interference, while the communication terminal with a single RF module suffers receiving conflicts.

To solve the problems described above, embodiments of the present disclosure provide an arbitration method for arbitrating receiving conflict in a multi-mode multi-SIM multi-standby communication terminal. The arbitration method includes:

determining if there r at least two cards to receive messages in a time cycle while all of the cards are in standby states, the time cycle being a radio frame of one card;

identifying types of messages to be received by the at least two cards after determining there are at least two cards to receive messages in the time cycle, and the types of messages including paging message and broadcast message;

determining if a receiving conflict occurs; and arbitrating based on the types of receiving conflicts and obtaining arbitration results after determining there is a receiving conflict;

the arbitration results comprising:

if the receiving conflict exists among cards which are to receive broadcast messages, the broadcast messages are received based on the priorities of all the broadcast messages to be received;

if the receiving conflict exists among cards which are to receive broadcast messages and paging messages, the paging messages are received preferentially; and if the receiving conflict exists among cards which are to receive paging messages, the paging messages are received based on the paging periods of all the paging messages to be received.

Optionally, receiving broadcast messages based on the priorities of all the broadcast messages to be received includes: comparing the priorities of all the broadcast messages to be received and receiving the broadcast message with a relatively higher priority.

Optionally, the method further includes: creating a priority list of broadcast messages before arbitrating, in which priorities which are predetermined according to the types of broadcast messages are stored, and obtaining the priorities of the broadcast messages to be received by inquiring the priority list of broadcast messages.

Optionally, the method further includes: raising the priorities of the broadcast messages which are not received and updating the priority list of broadcast messages, after receiving the broadcast messages based on the priorities of all the broadcast messages to be received.

Optionally, the method further includes: if the receiving conflict exists among cards which are to receive broadcast messages and paging messages, recording the type of the broadcast messages not received which is configured to be received at the next appearance after receiving the paging message.

Optionally, receiving the paging messages based on the paging periods of all the paging messages to be received includes: comparing the lengths of the paging periods of all the paging messages to be received and receiving the paging message with a relatively longer paging period.

Optionally, the method further includes: after receiving the paging message with a relatively longer paging period, configuring the paging messages with relatively shorter paging periods to be received at the next appearance.

To solve the above problems, embodiments of the present disclosure further provide an arbitration device for arbitrating receiving conflict in a multi-mode multi-SIM multi-standby communication terminal. The arbitration device includes:

a receiving and determining unit, adapted to determine if there are at least two cards to receive messages in a time cycle while all of the cards are in standby states, the time cycle being a radio frame of one card;

a message type identifying unit, adapted to identify types of messages to be received by the at least two cards after determining there are at least two cards to receive messages in the time cycle, and the types of messages including paging message and broadcast message;

a receiving conflict determining unit, adapted to determine if a receiving conflict occurs after the types of messages to be received being identified by the message type identifying unit; and an arbitrating unit, adapted to arbitrate the receiving conflict based on the types of receiving conflicts and obtain arbitration results after determining there is receiving conflict;

the arbitration results comprising:

if the receiving conflict exists among cards which are to receive broadcast messages, the broadcast messages are received based on the priorities of all the broadcast messages to be received;

if the receiving conflict exists among cards which are to receive broadcast messages and paging messages, the paging messages are received preferentially; and if the receiving conflict exists among cards which are to receive paging messages, the paging messages are received based on the paging periods of all the paging messages to be received.

Optionally, the arbitrating unit receiving the broadcast messages based on the priorities of all the broadcast messages to be received includes: comparing the priorities of all the broadcast messages to be received and receiving the broadcast message with a relatively higher priority.

Optionally, the arbitrating unit includes a priority list of broadcast messages, in which priorities which are predetermined according to the types of broadcast messages are stored, and the priorities of the broadcast messages to be received are obtained by inquiring the priority list of broadcast messages.

Optionally, the arbitrating unit s further adapted to raise the priorities of the broadcast messages which are not received and to update the priority list of broadcast messages, after receiving the broadcast messages based on the priorities of all the broadcast messages to be received.

Optionally, the arbitrating unit is further adapted to record the types of the broadcast messages not received which are configured to be received at the next appearance after obtaining the arbitration result of receiving the paging message, it the receiving conflict exists among cards which are to receive broadcast messages and paging messages.

Optionally, the arbitrating unit receiving the paging messages based on the paging periods of all the paging messages to be received includes: comparing the lengths of the paging periods of all the paging messages to be received and receiving the paging message with a relatively longer paging period.

Optionally, the arbitrating unit is further adapted to configure the paging messages with relatively shorter paging periods to be received at the next appearance, after receiving that with a relatively longer paging period.

To solve the above problems embodiments of the present disclosure further provide a multi-mode multi-SIM multi-standby communication terminal The communication terminal includes: a transceiver device and the arbitration device for arbitrating receiving conflict described above, the transceiver device adapted to receive broadcast messages or paging messages based on the arbitration result obtained by the arbitration device.

Optionally, the multi mode is a combination including one of the at least two modes of TD-SCDMA, WCDMA, TD-LTE, FDD LTE, and GSM.

Optionally, the multi-mode multi-SIM multi-standby communication terminal is a dual-mode dual-SIM dual-standby mobile phone, and the dual mode is TD-SCDMA and GSM, or, WCDMA and GSM.

Compared with the prior art, embodiments of this disclosure have the following advantages:

By setting a radio frame of one card as a time cycle while all of the cards inserted in the multi-mode multi-SIM multi-standby communication terminal are in standby states, if there is a receiving conflict among the cards to receive message in the time cycle, an arbitration process is performed based on the types of receiving conflicts. The arbitration results include: receiving the paging message is preferentially, which thereby avoids missing in-coming calls; receiving the paging message based on the paging periods of all the paging messages to be received, which thereby reduces the time consumption for the paging effectively; and receiving the broadcast messages based on the priorities of all the broadcast messages to be received, which ensures that the broadcast message of importance level is received first.

By creating a priority list of broadcast message dynamically to manage the priorities of the broadcast message, it is reasonably and effectively to ensure the arbitration for receiving conflicts.

DETAILED DESCRIPTION OF THE DISCLOSURE the prior art, a multi-mode multi-SIM multi-standby communication terminal with multiple RF transceiver modules suffers additional cost and power consumption, a short standby time, and serious co-channel interference, while the communication terminal with a single RF module suffers a receiving conflict. Embodiments of the present disclosure provide a multi-mode multi-SIM multi-standby communication terminal with a single RF transceiver module. By setting a radio frame of one card via a radio interface as a time cycle while all of the cards installed in the multi-mode multi-SIM multi-standby communication terminal are in the standby state, receiving conflicts among the cards are judged within a radio frame of the card, and an arbitration process is performed based on the types of the receiving conflicts. The communication terminal according to the embodiments of the present disclosure can achieve all of the advantages of a conventional communication terminal with multiple RF transceiver modules. Besides this, cost and power consumption are reduced, design complexity of hardware systems is lowered, and co-channel interference is avoided. In order to clarify the objects, characteristics and advantages of the disclosure, the embodiments of the present disclosure will be described in detail in conjunction with the accompanying drawings.

The disclosure will be described with reference to certain embodiments. It will be understood by those skilled in the art that various changes may be made without departing from the spirit or scope of the disclosure. Accordingly, the present disclosure is not limited to the embodiments disclosed.

Figure 1:
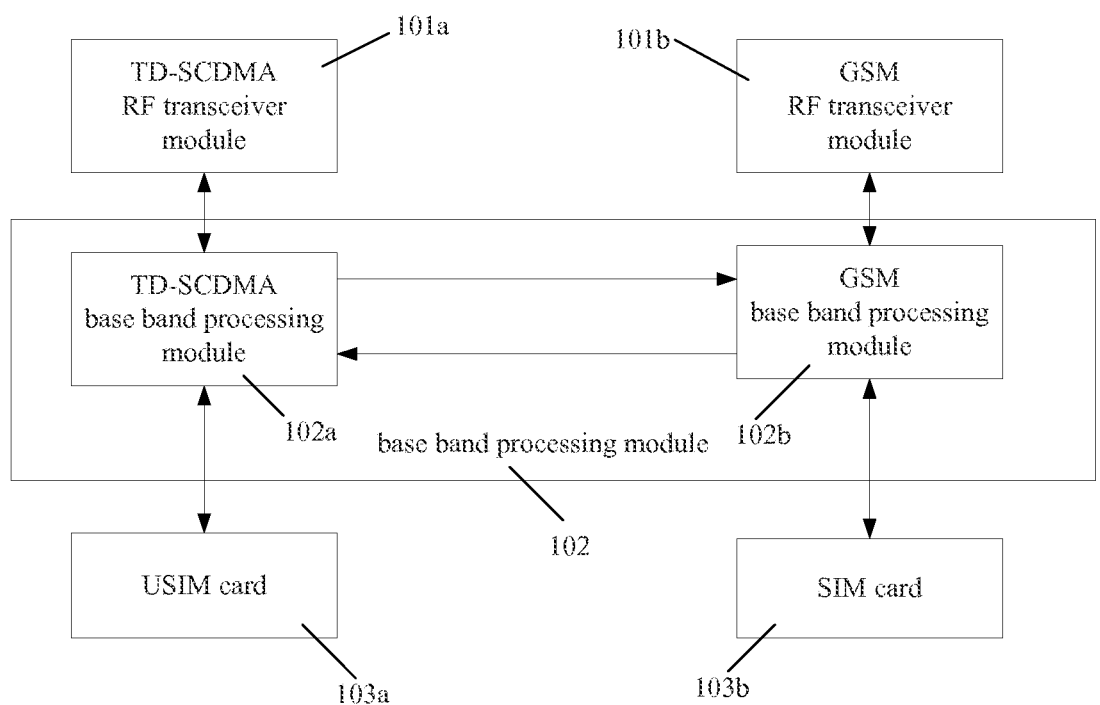
FIG. 1 is a schematic structural diagram of a dual-mode dual-SIM dual-standby communication terminal according to the prior art.
Figure 2:
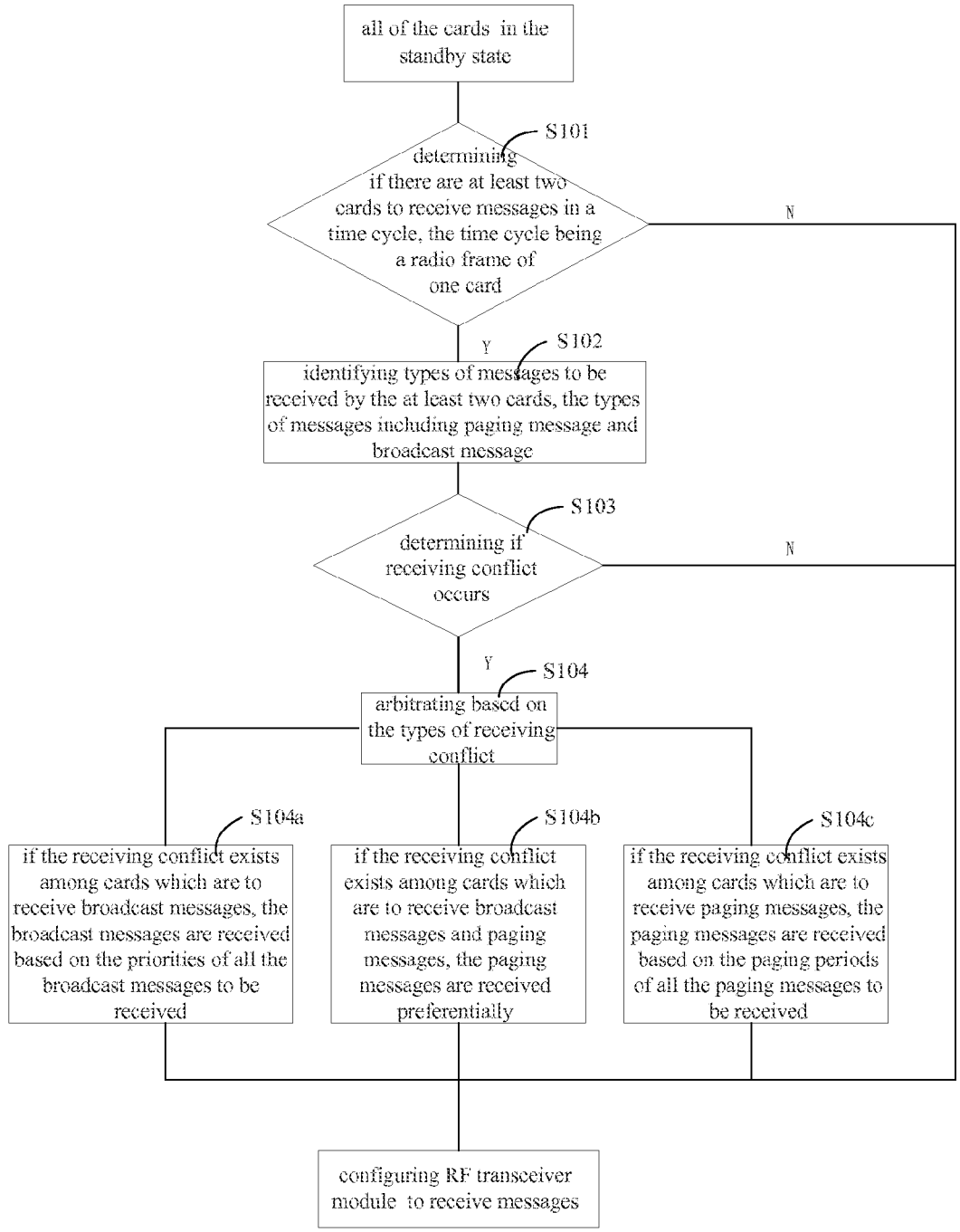
FIG. 2 is a schematic flow chart of an arbitration method for arbitrating receiving conflict in a multi-mode multi-SIM multi-standby communication terminal according to an embodiment of the present disclosure.

FIG. 2 is a schematic flow chart of an arbitration method for arbitrating receiving conflict in a multi-mode multi-SIM multi-standby communication terminal according to an embodiment of the present disclosure. As shown in FIG. 2, the arbitration method includes the following steps of S101, S102, S103, and S104.

Step S101 is performed to determine if there are at least two cards to receive messages in a time cycle, the time cycle being a radio frame of one card. If there is no or only one card to receive messages in the time cycle, the RE transceiver module is configured to receive message. As for a GSM system, a GSM frame is employed to act as the time cycle; as for a TD-SCDMA system or a WCDMA system, a sub-frame or a radio frame is employed to act as the time cycle; as for a TD-LTE, a radio frame, a half-frame or a sub-frame is employed to act as the time cycle; and as for an FDD LTE, a radio frame, or a sub-frame is employed to act as the time cycle.

If there are at least two cards to receive message in the time cycle, step S102 is performed to identify types of messages to be received by the at least two cards. The types of messages include paging message and broadcast message.

Step S103 is performed to determine if a receiving conflict occurs. If there is no receiving conflict, the RF transceiver module is configured to receive message.

If there is a receiving conflict, step S104 is performed to arbitrate based on the types of receiving conflicts. Step S104 further includes the steps of S104a, S104b, and S104c to obtain the arbitration results.

In step S104a, if the receiving conflict exists among cards which are to receive broadcast messages, the broadcast messages are received based on the priorities of all the broadcast messages to be received. Specifically, the priorities of all the broadcast messages to be received are compared and the broadcast message with a relatively higher priority is received first.

In step S104b, if the receiving conflict exists among cards which are to receive broadcast messages and paging messages, the paging messages are received preferentially. After receiving the paging message, the type of the broadcast message which is not received in the current time cycle is recorded and the broadcast message is configured to be received at the next appearance. In step S104c, if the receiving conflict exists among cards which are to receive paging messages, the paging messages are received based on the paging periods of all the paging messages to be received. Specifically, the paging periods of all the paging messages to be received are compared and the paging message with a relatively longer paging period is received first.

After the step of S104a, S104b, or S104c is performed, the RE transceiver module is configured to receive message based on the arbitration results.

The arbitration method for arbitrating receiving conflict in a multi-mode multi-SIM multi-standby communication terminal will be described in detail with reference to the embodiments below.

In the embodiments, the multi-mode multi-SIM multi-standby communication terminal is a dual-mode dual-SIM dual-standby mobile phone with a single RF transceiver module. The two modes may be TD-SCDMA and GSM, or may be WCDMA and GSM. The two SIM may be a USIM card in the TD-SCDMA or WCDMA mode, or may be a SIM card in the GSM mode. The USIM card camps on the TD-SCDMA or WCDMA system, and the SIM card camps on the GSM system. When the two cards are in the standby state, the signals of the two modes can not be received at the same time due to the single RF transceiver module. How to configure the RE resource reasonably so that paging message or broadcast message of the two cards can be received at different time periods has been a critical issue to be solved in the dual-mode dual-SIM dual-standby mobile phone with a single RE transceiver module, such as TD-SCDMA and GSM, or WCDMA and GSM. Embodiments of the present disclosure provide a method to arbitrate various receiving conflicts, so that RF resource is configured reasonably, and the standby and communication function of two cards are achieved in the dual-mode mobile phone. It should be noted that, in other embodiments, the dual-SIM cards may be a SIM card in the TD-SCDMA or WCDMA mode, and a USIM card in the GSM mode; or two SIM cards in the two modes; or two USIM cards in the two modes. As for the dual-mode communication, it may be two modes selected from TD-LTE, FDD LTE, and GSM. That is, as for the multi-mode communication, it may be at least two modes selected from the group consisting of TD-SCDMA, GSM, WCDMA, TD-LTE, and FDD LTE. The arbitration method for arbitrating receiving conflict in a multi-mode multi-SIM multi-standby communication terminal according to the embodiments of the present disclosure is independent of the difference between frame structures in various communication modes.

Figure 3:
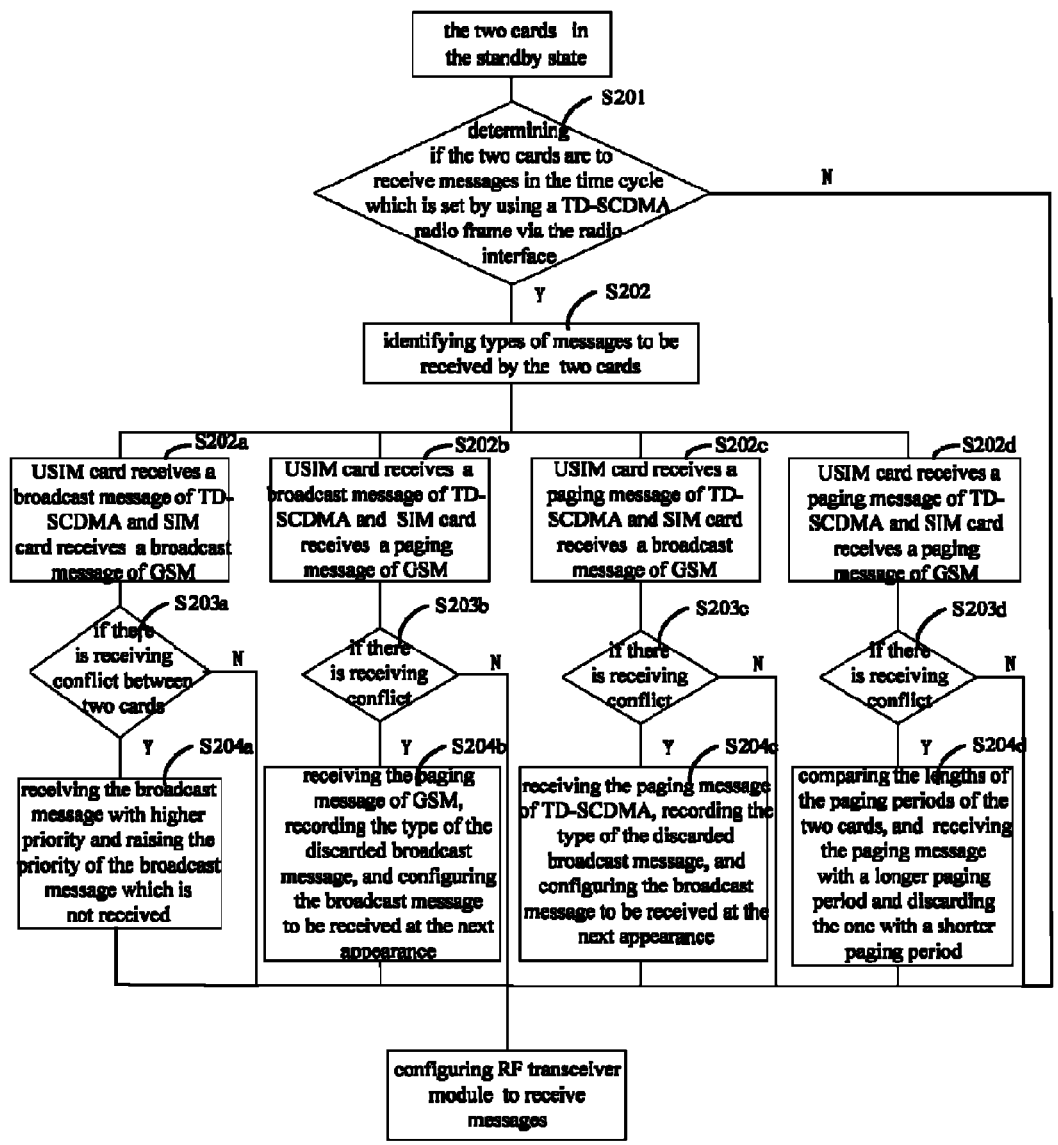
FIG. 3 is a schematic flow chart of an arbitration method for arbitrating receiving conflict in a dual-mode dual-SIM dual-standby mobile phone according to an embodiment of the present disclosure.

FIG. 3 is a schematic flow chart of an arbitration method for arbitrating receiving conflict in a dual-mode dual-SIM dual-standby mobile phone according to an embodiment of the present disclosure. Referring to FIG. 3, when the two cards are in the standby state, step S201 is performed to determine if the two cards are to receive message in a time cycle (namely, a same frame such as a radio frame or a sub-frame of TD-SCDMA) which is a TD-SCDMA radio frame of one card via radio interface. If the two cards are not to receive message in the same frame, the RF transceiver module is configured to receive message. And if yes, step S202 is performed to identify types of messages to be received.

Because a USIM card camping on TD-SCDMA needs to receive broadcast message on the Broadcast Channel (BCH) and paging message on the Paging Indication Channel (PICH) or the Paging Channel (PCH), while a SIM card camping on GSM needs to receive broadcast message on the Broadcast control channel (BCCH) and paging message on the Paging Channel (PCH), the types of messages to be received by the two cards in the same frame may include: S202a, the USIM card receives a broadcast message of TD-SCDMA and the SIM card receives a broadcast message of GSM; S202b, the USIM card receives a broadcast message of TD-SCDMA and the SIM card receives a paging message of GSM; S202c, the USIM card receives a paging message of TD-SCDMA and the SIM card receives a broadcast message of GSM; S202d, the USIM card receives a paging message of TD-SCDMA and the SIM card receives a paging message of GSM. Due to the asynchronism between the TD-SCDMA mode and the GSM mode, it is required to determine if a receiving conflict occurs based on the above-mentioned types of messages to be received, that is, to determine if there is a receiving conflict between the two cards according to each one of the types of messages to be received. The determining process includes the steps of S203a, S203b, S203c, and S203d, as shown in FIG. 3. To determine if there is a receiving conflict between the two cards, it is performed by determining if there is an overlapping between reception time periods, which may be completely or partly.

Figure 4:
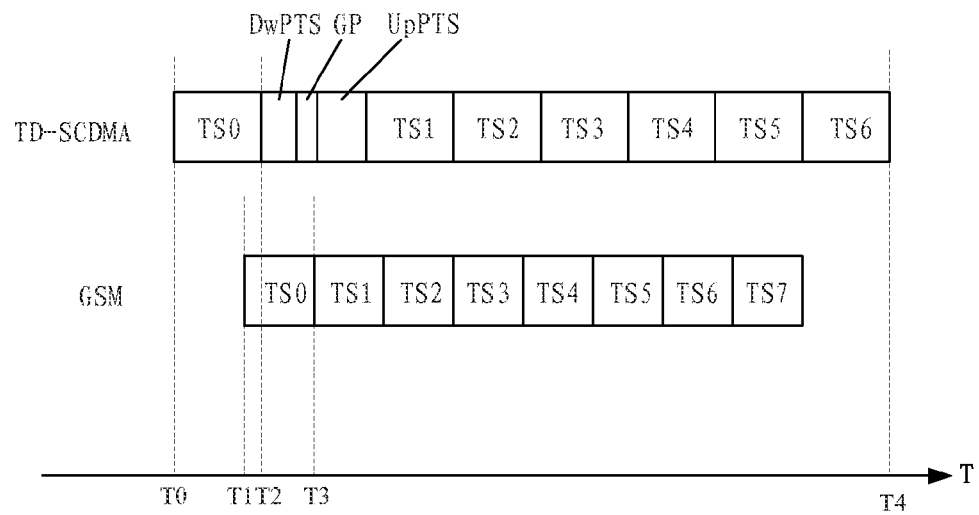
FIG. 4 is a schematic diagram illustrating receiving conflict occurs in the dual-mode dual-SIM dual-standby mobile phone of FIG. 3 according to an embodiment of the present disclosure.

It is known to those skilled in the art that a TDMA radio frame according to the 3$^{rd}$ Generation Partnership Project (3GPP) has a length of 10 ms, and the sub-frame has a length of 5 ms. To achieve fast power control, timing advanced calibration, and to support for some new techniques, such as smart antenna and uplink synchronism, the TDMA radio frame having a length 10 ms is divided into two sub-frames with a same structure, and each sub-frame has a length of 5 ms. Each sub-frame is divided into 7normal time slots having a length of 675 μs and 3 special time slots. FIG. 4 is a schematic diagram illustrating a receiving conflict occurs in the dual-mode dual-SIM dual-standby mobile phone of FIG. 3 according to an embodiment of the present disclosure. As shown in FIG. 4, the 7 normal time slots includes TS0~TS6, the 3 special time slots includes Downlink Pilot Time Slot (DwPTS), Guard Period (GP), and Uplink Pilot Time Slot (UpPTS). The 7 normal time slots serve to transmit user data and control message. TS0 is fixed to be the downlink time slot to transmit system broadcast message, while TS1 is fixed to be the uplink time slot. The other normal time slots may be flexibly configured to be uplink or downlink time slots to achieve asymmetrical transmission, such as packet data transmission. However, in the GSM mode, a TDMA frame typically includes 8 time slots, such as TS0~TS7 shown in FIG. 4, and each time slot has a length of 577 μs. Each time slot constitutes a physical channel. The physical channels can be multiplexed by reusing the time slots, so as to form logic channels. The logic channels may include Traffic Channels (TCH) and Control Channels (CCH). The TCHs are intended to carry the coded voice data or user data, and to exchange data between the voice service and data service. The CCHs are intended to transmit signaling or synchronization data. The CCH is further divided into three categories: Broadcast Control Channel (BCH), Common Control Channel (CCCH), and Dedicated Control Channel (DCCH). All kinds of broadcast messages are transmitted on the BCCH, and the paging messages are transmitted on the paging channel contained in the CCCH. Generally, the paging messages and the broadcast messages are transmitted by using TS0.

A sub-frame structure of TD-SCDMA and a TDMA frame structure of GSM are illustrated in FIG. 4. In an embodiment, a radio frame via a TD-SCDMA radio interface acting as a time cycle is to specifically employ a sub-frame of TD-SCDMA as the time cycle. In another embodiment, a radio frame of TD-SCDMA may be used as the time cycle. Referring to FIG. 4, the sub-frame of TD-SCDMA includes 7 normal time slots including TS0~TS6, and 3 special time slots including Downlink Pilot Time Slot (DwPTS), Guard Period (GP), and Uplink Pilot Time Slot (UpPTS). In this case, to determine if the two cards are to receive message in the time cycle which is set by using a TD-SCDMA radio frame via the radio interface means to determine if the two cards are to receive message in the time cycle from the start time point T0 to the end time point T4 of a sub-frame of TD-SCDMA. In other embodiments, a TDMA frame of GSM may act as a time cycle to determine if the two cards are to receive message in the time cycle.

Referring to FIG. 4, as for the TS0 in the sub-frame of TD-SCDMA which is adapted to transmit a broadcast message or a paging message, the start time point of TS0 is T0, which is also the start time point of the sub-frame, and the end time point of TS0 is T2. While, as for the TS0 in the TDMA frame of GSM which is adapted to transmit a broadcast message or a paging message, the start time point is T1, and the end time point is T1. As shown in FIGS. 4, T1 to T2 is a receiving overlap between the USIM card and the SIM card, that is, there is a receiving conflict between the two cards. It should be noted that the receiving overlap between the two cards illustrated in FIG. 4 is a partial overlap. If the start time point T1 to the end time point T3 in the TDMA frame of GSM falls within the start time point T0 to the end time point T2 in the sub-frame of TD-SCDMA, then the receiving overlap between the two cards is a complete overlap. In this embodiment, because T0 and T1 may be obtained when the USIM card camps on the TD-SCDMA and the SIM card camps on the GSM, and the lengths of each time slot in the sub-frame of TD-SCDMA and in the TDMA frame of GSM are also known, T0, T1, T2, T3, and T4 may be obtained in advance. Accordingly, in the time cycle from T0 to T4 of a sub-frame of TD-SCDMA, if there is a receiving conflict between the two cards may be acquired by determining if T1 or T3 falls within the period of T0 to T2.

As described above, any one of the steps of S203a, S203b, S203c, and S203d may be performed to determine if there is a receiving conflict. If there is no receiving conflict, the RF transceiver module is configured to receive message. And if there is a receiving conflict, an arbitration method is performed based on the types of receiving conflicts, which includes the steps of S204a, S204b, S2104c, and S2104d, so as to obtain the arbitration result.

Specifically, if the receiving conflict occurs when the USIM card receives a broadcast message of TD-SCDMA and the SIM card receives a broadcast message of GSM, the step S204a is performed to receive the broadcast message with higher priority and raise the priority of the broadcast message which is not received. In this case, because each data packet corresponds to 4 sub-frames of TD-SCDMA for BCH receiving the broadcast message, and each data packet corresponds to 4 TDMA frames of GSM for BCCH receiving the broadcast message, the quantity of all the broadcast messages of TD-SCDMA and GSM to be received is very large. To facilitate arbitration, it is required to configure multi-level priorities which are ranged in descending order of importance levels. A priority of a broadcast message is not permanent, that is, if the broadcast message is not received due to a receiving conflict, the priority thereof be raised to increase the possibility of reception after being discarded. Specifically, if the receiving conflict occurs between a broadcast message of TD-SCDMA and a broadcast message of GSM, because both the types of the broadcast messages are known, the priority of the broadcast message of TD-SCDMA received by the USIM card may be compared with the priority of the broadcast message of GSM received by the SIM card based on the types of the broadcast messages. Then, the broadcast message with a higher priority is received, and the other one with lower priority is discarded. It should be noted that, before arbitration, a priority list of broadcast messages is created, in which priorities which are predetermined according to the types of broadcast message are stored. A relatively higher priority is assigned to a broadcast message of higher importance level, while a relatively lower priority is assigned to a broadcast message of relatively lower importance level. For example, a broadcast message of a Random Access Channel (RACH) parameter is assigned with a relatively higher priority, while a neighbouring cell description, and a permitted Network Color Code (NCC) are assigned with a relatively lower priority. The priorities of the broadcast messages to be received may be obtained by inquiring the priority list of broadcast messages. The priority list of broadcast messages is updated after raising the priority of a broadcast message which is not received. In conclusion, the created priority list of broadcast messages may be updated dynamically, namely, the priority predetermined initially may be varied constantly. By raising the priority of a broadcast message which is not received in a time cycle, the possibility of receiving the broadcast message may be increased greatly during the later time cycles, otherwise, the broadcast message with a lower priority may not be received successfully due to the receiving conflict.

If the receiving conflict occurs when the USIM card receives a broadcast message of TD-SCDMA and the SIM card receives a paging message of GSM, step S204b is performed to receive the paging message of GSM, temporarily discard the broadcast message of TD-SCDMA, record the type of the temporarily discarded broadcast message, and configure the broadcast message to be received at the next appearance. In this case, the principle of arbitration is to receive the paging message preferentially to avoid missing in-coming calls or short messages. Accordingly, the broadcast message of TD-SCDMA is temporarily discarded without considering its priority, the paging message of GSM is received, and the type of the broadcast message of TD-SCDMA which has been temporarily discarded is recorded. The location of the broadcast message may be calculated accurately according to the frame number, which is configured to be received at a corresponding location at the next appearance.

If the receiving conflict occurs when the USIM card receives a paging message of TD-SCDMA and the SIM card receives a broadcast message of GSM, step S204c is performed to receive the paging message of TD-SCDMA, temporarily discard the broadcast message of GSM, record the type of the broadcast message, and configure the broadcast message to be received at the next appearance. The arbitration method in the case that the USIM card receives the paging message of TD-SCDMA and the SIM card receives the broadcast message of GSM is similar to that in the case that the USIM card receives the broadcast message of TD-SCDMA and the SIM card receives the paging message of GSM. That is, the paging message of TD-SCDMA is received preferentially, the broadcast message of GSM is temporarily discarded, and the type of the broadcast message of GSM which has been temporarily discarded is recorded. The location of the broadcast message may be calculated accurately according to the frame number, which is configured to be received at a corresponding location at the next appearance.

If the receiving conflict occurs when the USIM card receives a paging message of TD-SCDMA and the SIM card receives a paging message of GSM, step S204d is performed to compare the lengths of the paging periods of the two cards, and to receive the paging message with a longer paging period and discard the one with a shorter paging period. In a specific embodiment, the paging message of TD-SCDMA may employ a paging period of any one of, such as 80 ms, 160 ms, 320 ms, 640 ms, 1.28 s, 2.56 s, and 5.12 s, which may be selected according to the configuration of a network entity.

The paging period of GSM may be 2-9 times of 235 ms. Because the two paging periods are different, conflict between different cards receiving paging messages may not occur in succession. Besides, the paging message is repeatedly transmitted from the network entity. Therefore, paging messages may not be lost during the standby state by arranging the reception of the paging message reasonably for the dual-SIM terminal, thereby avoiding missing in-coming calls or short messages. Because paging messages with a shorter paging period are transmitted at a higher frequency, thus, they have a larger possibility to be received. As a consequence, if there is a receiving conflict between the two cards, the paging message with a longer paging period is received and the other one with a shorter paging period is discarded by comparing the lengths of the paging periods between TD-SCDMA and GSM. For example, if the paging periods of TD-SCDMA and GSM are 160 ms and 235 ms respectively, the paging message of GSM is received preferentially, and the paging message of TD-SCDMA is discarded temporarily. Moreover, the paging message with a relatively shorter paging period is configured to be received at the next appearance after the arbitration process, which reduces the time taken for processing the paging messages.

After the step of S204a, S204b, S2104c, or S2104d is implemented, the RF transceiver module is configured to receive messages based on the above-mentioned arbitration results.

It should be noted that a dual-mode dual-SIM dual-standby communication terminal is taken as an example to describe the arbitration method for arbitrating receiving conflict in a multi-mode multi-SIM multi-standby communication terminal. Specifically, the dual modes are TD-SCDMA and GSM. In other embodiments, the arbitration method may be applicable to other multi-mode multi-SIM multi-standby communication terminals, e.g., triple-mode triple-SIM triple-standby communication terminals. If there is no receiving conflict among the three cards, the RF transceiver module is configured to receive messages. If there is a receiving conflict between any two of the cards, the solution may be obtained by referring to the above-mentioned arbitration method according to the embodiments. If there is a receiving conflict among the three cards simultaneously, the arbitration method is performed according to the types of receiving conflicts of the three cards, and the paging message is received preferentially. In the event that all the three cards are to receive paging messages, the paging message with the longest paging period is received preferentially. In the event that all the three cards are to receive broadcast messages, the paging message with the highest priority is received preferentially. Further, in the event that the broadcast messages have the same priority, the card which receives the broadcast message firstly in the current time cycle is configured to receive messages. And in the event that some of the cards in a multi-SIM terminal have a same communication mode, and the paging period are the same, the card which receives the paging message firstly is configured to receive messages in the current time cycle.

Figure 5:
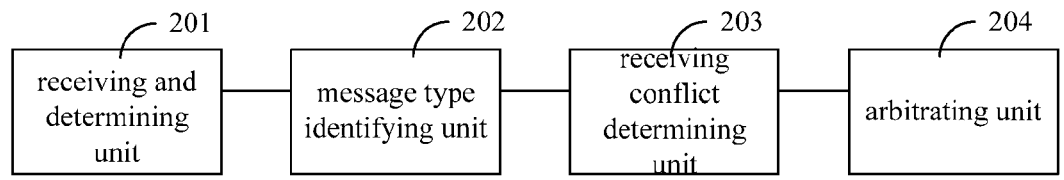
FIG. 5 is a schematic structural diagram of an arbitration device for arbitrating receiving conflict in a multi-mode multi-SIM multi-standby communication terminal according to an embodiment of the present disclosure.

Based on the arbitration method for arbitrating receiving conflict in a multi-mode multi-SIM multi-standby communication terminal described in the above embodiments of the present disclosure, an arbitration device for arbitrating receiving conflict in a multi-mode multi-SIM multi-standby communication terminal is also provided according to another embodiment of the present disclosure. FIG. 5 is a schematic structural diagram of an arbitration device for arbitrating receiving conflict in a multi-mode multi-SIM multi-standby communication terminal. As shown in FIG. 5, the arbitration device includes: a receiving and determining unit 201, a message type identifying unit 202, a receiving conflict determining unit 203, and an arbitrating unit 204.

The receiving and determining unit 201 is adapted to determine if there are at least two cards to receive messages in a time cycle while all the cards of a multi-mode multi-SIM multi-standby communication terminal are in the standby state. The time cycle is a radio frame of one card.

The message type identifying unit 202 is adapted to identify types of messages to be received by the at least two cards after determining there are at least two cards to receive messages in the time cycle, and the types of messages include paging message and broadcast message.

The receiving conflict determining unit 203 is adapted to determine if a receiving conflict occurs after the types of messages to be received are identified by the message type identifying unit.

The arbitrating unit 204 is adapted to arbitrate the receiving conflict based on the types of receiving conflicts and obtain arbitration results after determining there is a receiving conflict.

The arbitration results includes:

If the receiving conflict exists among cards which are to receive broadcast messages, the broadcast messages are received based on the priorities of all the broadcast messages to be received;

If the receiving conflict exists among cards which are to receive broadcast messages and paging messages, the paging messages are received preferentially; and If the receiving conflict exists among cards which are to receive paging messages, the paging messages are received based on the paging periods of all the paging messages to be received.

In an embodiment, the arbitrating unit 204 receiving the broadcast messages based on the priorities of all the broadcast messages to be received is achieved by comparing the priorities of all the broadcast messages to be received and obtaining the arbitration result that the broadcast message with the highest priority is to be received first. The arbitrating unit 204 includes a priority list of broadcast messages. The priorities which are predetermined according to types of broadcast messages are stored in the priority list of broadcast messages, and the priorities of the broadcast messages to be received are obtained by inquiring the priority list of broadcast messages. After receiving the broadcast message with the highest priority, the arbitrating unit 204 further raises the priorities of the broadcast messages which are not received and updates the priority list of broadcast messages. If the receiving conflict exists among cards which are to receive broadcast messages and paging messages, after obtaining the arbitration result of receiving the paging message, the arbitrating unit 204 further records the type of the broadcast message not received, so as to arrange the unreceived broadcast message to be received at the next appearance. The arbitrating unit 204 receiving the paging messages based on the paging periods of all the paging messages to be received is achieved by comparing paging periods of all the paging messages to be received and receiving the paging message with a longest paging period. After that, the paging messages with relatively shorter paging periods are configured to be received at the next appearance.

Based on the arbitration device for arbitrating receiving conflict in a multi-mode multi-SIM multi-standby communication terminal described above, a multi-mode multi-SIM multi-standby communication terminal is also provided according to another embodiment of the present disclosure. The multi-mode multi-SIM multi-standby communication terminal includes a transceiver device and the arbitration device for arbitrating receiving conflict described above. The transceiver device includes a RF transceiver module, which is adapted to receive a broadcast message or a paging message based on the arbitration result obtained by the arbitration device. In a specific embodiment, the multi-mode multi-SIM multi-standby communication terminal is a dual-mode dual-SIM dual-standby mobile phone. The dual modes may be TD-SCDMA and GSM, or, WCDMA and GSM.

Details about the multi-mode multi-SIM multi-standby communication terminal and the arbitration device for arbitrating receiving conflict thereof, please refer to the above-mentioned embodiments about the arbitration method for arbitrating receiving conflict in a multi-mode multi-SIM multi-standby communication terminal, which are not described in detail herein.

In summary, the multi-mode multi-SIM multi-standby communication terminal and the arbitration device and the arbitration method for arbitrating receiving conflict thereof according to the embodiments of this disclosure have the following advantages.

By setting a radio frame of one card as a time cycle while all of the cards installed in the multi-mode multi-SIM multi-standby communication terminal are in the standby state, if there is a receiving conflict among the cards to receive message in the time cycle, an arbitration process is performed based on the types of receiving conflicts. The arbitration results include: receiving a paging message preferentially, which avoids missing in-coming calls; receiving the paging message with the longest paging period after comparing lengths of paging periods of all the paging messages to be received, which reduces the time consumption for processing the paging messages; and receiving the broadcast message with the highest priority after comparing priorities of all the broadcast messages to be received, which ensures that the broadcast message of importance level is received first.

By creating a dynamically updated priority list of broadcast messages to manage the priorities of broadcast messages, the arbitration for receiving conflict is ensured reasonably and effectively.

The multi-mode multi-SIM multi-standby communication terminal with a single RF module can achieve all the functions of a terminal with dual RF transceiver modules. Besides this, the number of the chips to be used is reduced greatly, which thereby reduces cost and power consumption. In addition, due to a single RF module, design complexity of hardware systems is lowered, and co-channel interference is avoided.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A communication method in a multi-mode multi-subscriber identity module (SIM) multi-standby communication terminal, comprising:
   determining that a receiving conflict occurs among at least two cards in the communication terminal; and
   arbitrating based on types of receiving conflicts and obtaining arbitration results when a determination is made that there is a receiving conflict;
   the arbitration results comprising:
   when the receiving conflict exists among the at least two cards which are to receive broadcast messages, a broadcast message having a relatively high priority is received, the priorities of broadcast messages having relatively low priorities which are not received are raised to increase the possibility of being received at a next appearance of the broadcast messages having relatively low priorities;

when the receiving conflict exists among the at least two cards which are to receive broadcast messages and paging messages, the paging messages are received, and the types of the broadcast messages not received are recorded after receiving the paging messages; and when the receiving conflict exists among the at least two cards which are to receive paging messages, a paging message having a relatively longer paging period is received, and the paging messages with relatively shorter paging periods are configured to be received at a next appearance of the paging messages with relatively shorter paging periods.

2. The method according to claim 1, wherein when the receiving conflict exists among the at least two cards which are to receive broadcast messages, the method further: comparing the priorities of all the broadcast messages to be received.

3. The method according to claim 1, further comprising: creating a priority list of broadcast messages before arbitrating, in which priorities which are predetermined according to the types of broadcast messages are stored, and obtaining the priorities of the broadcast messages to be received by inquiring the priority list of broadcast messages.

4. The method according to claim 1, wherein before determining that a receiving conflict occurs among the at least two cards, the method further comprises:
  determining when at least two cards are available to receive messages in a same time cycle while all of the at least two cards are in standby states, the time cycle being a radio frame of one of the at least two cards; and
  identifying types of messages to be received by the at least two cards when a determination is made that there are at least two cards available to receive messages in the same time cycle, and the types of messages comprising paging message and broadcast message.

5. The method according to claim 1, wherein when the receiving conflict exists among the at least two cards which are to receive broadcast messages and paging messages, the method further comprises:
  calculating the locations of the broadcast messages not received according to frame numbers based on the records of the broadcast messages not received; and
  receiving the broadcast messages not received at a next appearance of the broadcast messages not received.

6. A communication device in a multi-mode multi-subscriber identity module (SIM) multi-standby communication terminal, comprising:
  a receiving conflict determining unit, adapted to determine that a receiving conflict occurs among at least two cards in the communication terminal; and
  an arbitrating unit, adapted to arbitrate receiving conflict based on types of receiving conflicts and obtain arbitration results when a determination is made that determining there is a receiving conflict;
  the arbitration results comprising:
    when the receiving conflict exists among the at least two cards which are to receive broadcast messages, a broadcast message having a relatively high priority is received, the priorities of broadcast messages having relatively low priorities which are not received are raised to increase the possibility of being received at a next appearance of the broadcast messages having relatively low priorities;
    when the receiving conflict exists among the at least two cards which are to receive broadcast messages and paging messages, the paging messages are received, and the types of the broadcast messages not received are recorded after receiving the paging messages; and
    when the receiving conflict exists among the at least two cards which are to receive paging messages, a paging message having a relatively longer paging period is received, and the paging messages with relatively shorter paging periods are configured to be received at a next appearance of the paging messages with relatively shorter paging periods.

7. The device according to claim 6, wherein when the receiving conflict exists among the at least two cards which are to receive broadcast messages, the arbitrating unit is further adapted to compare the priorities of all the broadcast messages to be received.

8. The device according to claim 6, wherein the arbitrating unit comprises a priority list of broadcast messages, in which priorities which are predetermined according to the types of broadcast messages are stored, and the priorities of the broadcast messages to be received are obtained by inquiring the priority list of broadcast messages.

9. A multi-mode multi-SIM multi-standby communication terminal, comprising a communication device according to claim 6, further comprising a communication device.

10. The device according to claim 9, wherein the multi mode is a combination comprising one of the at least two modes of time division synchronous code division multiple access (TD-SCDMA), wideband code division multiple access (WCDMA), time-division long-term evolution (TD-LTE), frequency division multiplex (FDD) LTE, and global system for mobile communications (GSM).

11. The device according to claim 9, wherein the multi-mode multi-SIM multi-standby communication terminal is a dual-mode dual-SIM dual-standby mobile phone, and the dual mode is TD-SCDMA and GSM, or, WCDMA and GSM.

12. The device according to claim 6, further comprises:
  a receiving and determining unit, configured to determine when there are at least two cards available to receive messages in a same time cycle while all of the at least two cards are in standby states, the time cycle being a radio frame of one of the at least two cards; and
  a message type identifying unit, configured to identify types of messages to be received by the at least two cards when determining there are at least two cards available to receive messages in the same time cycle, and the types of messages comprising paging message and broadcast message.

* * * * *

UNITED STATES PATENT AND TRADEMARK OFFICE
CERTIFICATE OF CORRECTION

PATENT NO. : 8,676,253 B2  
APPLICATION NO. : 13/574563  
DATED : March 18, 2014  
INVENTOR(S) : Li Page 1 of 1

It is certified that error appears in the above-identified patent and that said Letters Patent is hereby corrected as shown below:

On the title page, Item [54] and in the Specification, Col. 1 please replace the title with:

"MULTI-MODE MULTI-SIM MULTI-STANDBY COMMUNICATION TERMINAL, AND ARBITRATION METHOD AND DEVICE FOR ARBITRATING RECEIVING CONFLICT THEREOF"

Signed and Sealed this  
Third Day of June, 2014

Michelle K. Lee  
*Deputy Director of the United States Patent and Trademark Office*